(12) United States Patent
Akita et al.

(10) Patent No.: US 7,447,271 B2
(45) Date of Patent: *Nov. 4, 2008

(54) RADIO RECEIVING APPARATUS AND METHOD

(75) Inventors: Koji Akita, Yokohama (JP); Kazumi Sato, Kawasaki (JP); Kuniaki Ito, Kawasaki (JP); Akihiro Tsujimura, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/930,326

(22) Filed: Oct. 31, 2007

(65) Prior Publication Data

US 2008/0063108 A1    Mar. 13, 2008

Related U.S. Application Data

(63) Continuation of application No. 10/950,396, filed on Sep. 28, 2004, now Pat. No. 7,308,037.

(30) Foreign Application Priority Data

Jan. 26, 2004    (JP)    ............................. 2004-017338

(51) Int. Cl.
    *H04B 7/02*    (2006.01)
(52) U.S. Cl. ...................... 375/267; 375/316; 375/345; 455/232.1; 455/133; 455/136
(58) Field of Classification Search ................ 375/259, 375/260, 267, 271, 272, 278, 284, 316, 322, 375/324, 340, 344, 345, 346, 347, 349, 350; 455/39, 62, 63.1, 65, 73, 562.1, 130, 132, 455/133, 136, 137, 138, 140, 165.1, 230, 455/232.1

See application file for complete search history.

(56) References Cited

U.S. PATENT DOCUMENTS

| 5,721,757 A | 2/1998 | Banh et al. |
| 5,999,826 A | 12/1999 | Whinnett |
| 6,226,507 B1 | 5/2001 | Ramesh et al. |

(Continued)

FOREIGN PATENT DOCUMENTS

JP    3-70221    3/1991

(Continued)

*Primary Examiner*—Kevin Y Kim
(74) *Attorney, Agent, or Firm*—Oblon, Spivak, McClelland, Maier & Neustadt, P.C.

(57) ABSTRACT

Radio receiving apparatus includes antennas, radio units adjusting gains of received signals, and outputting the adjusted received signals, respectively, converters converting the adjusted received signals into digital signals, selector device which selects several of the digital signals, combination of the selected digital signals exhibiting good receiving characteristic, controller which determines the gains and outputs single control signal included in information of the determined gains to certain radio units, the certain radio units being included in the radio units and connected to certain converters of the converters which output digital signals included in the selected combination, weight calculator which calculates weight for each of the selected digital signals to enhance the receiving characteristic if the controller outputs the single control signal, synthesizer which synthesizes, into synthetic digital signal, digital signals obtained by multiplying each of the selected digital signals by the weight, and demodulator which demodulates the synthetic digital signal.

14 Claims, 5 Drawing Sheets

U.S. PATENT DOCUMENTS

| | | |
|---|---|---|
| 6,622,013 B1 | 9/2003 | Miyoshi et al. |
| 7,145,940 B2 | 12/2006 | Gore et al. |
| 7,308,037 B2 * | 12/2007 | Akita et al. ................. 375/267 |

FOREIGN PATENT DOCUMENTS

| | | |
|---|---|---|
| JP | 6-90193 | 3/1994 |
| JP | 9-247005 | 9/1997 |
| JP | 2000-183795 | 6/2000 |
| JP | 2003-152611 | 5/2003 |

* cited by examiner

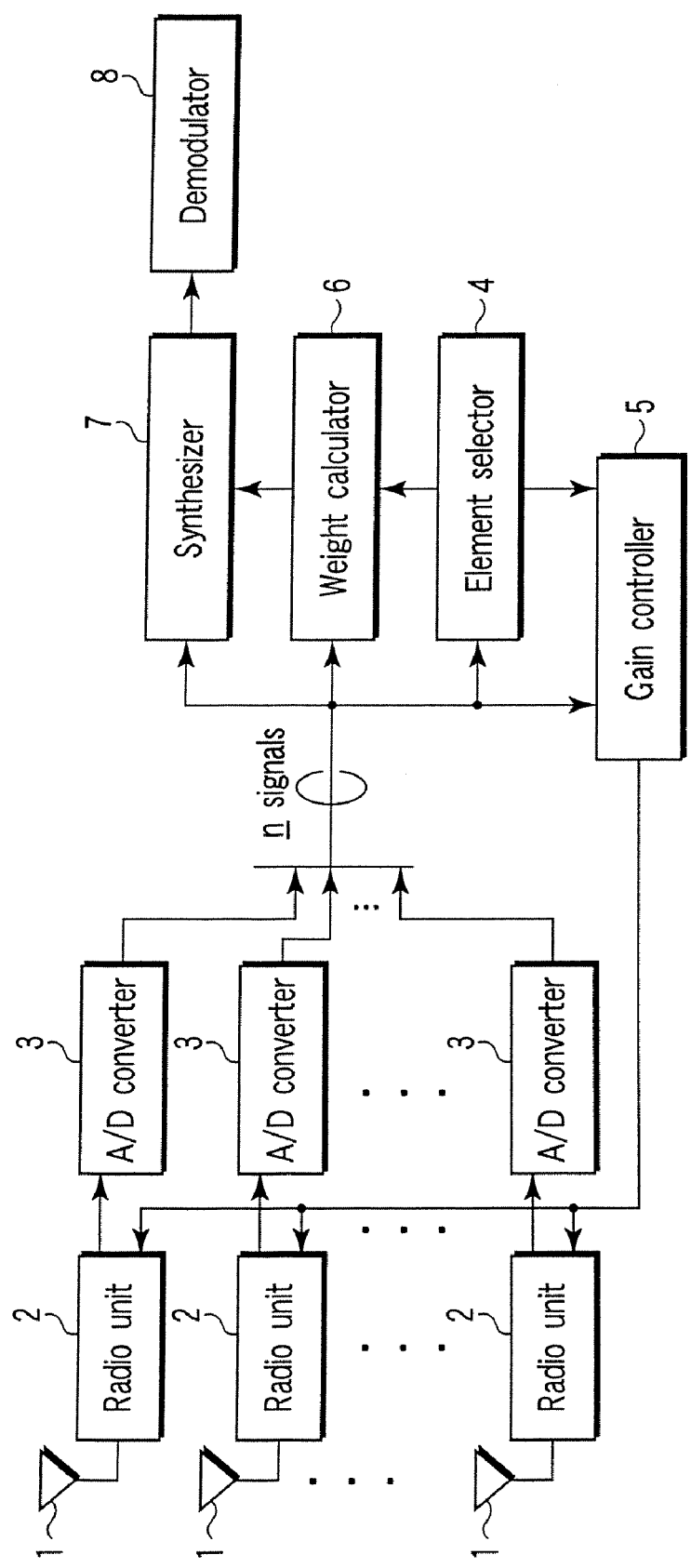
F I G. 1

Numerical data in digital signal

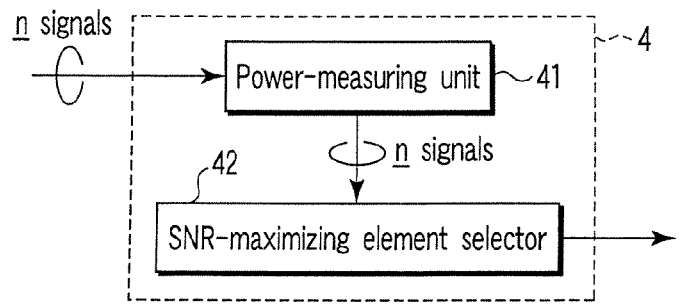
F I G. 4
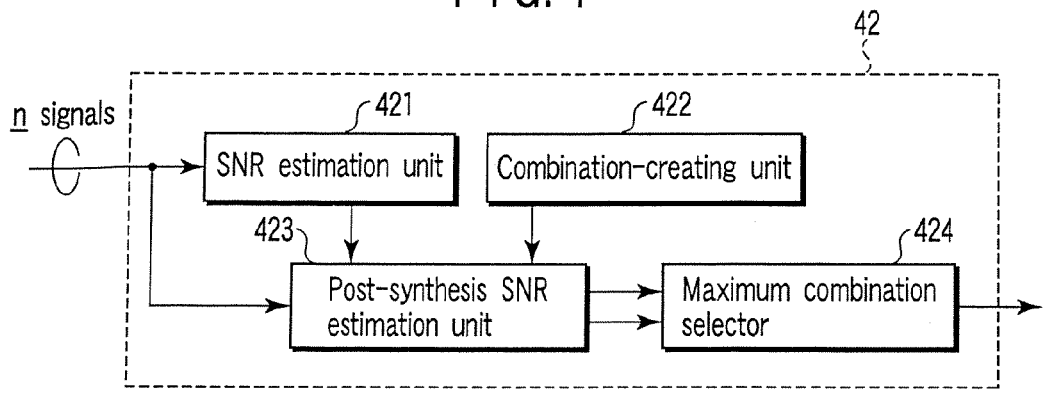
F I G. 5
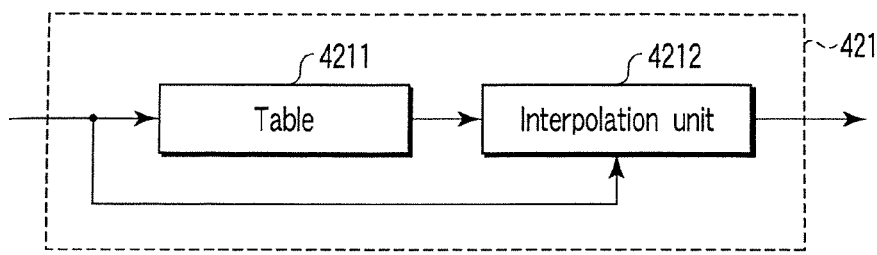
F I G. 6
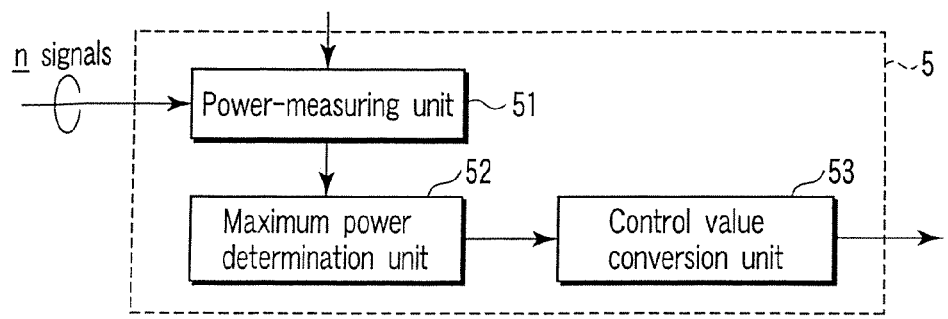
F I G. 7

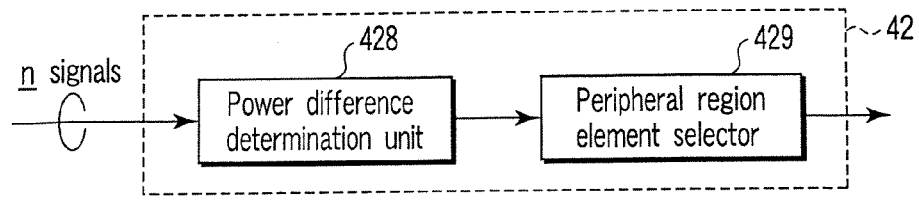
F I G. 11
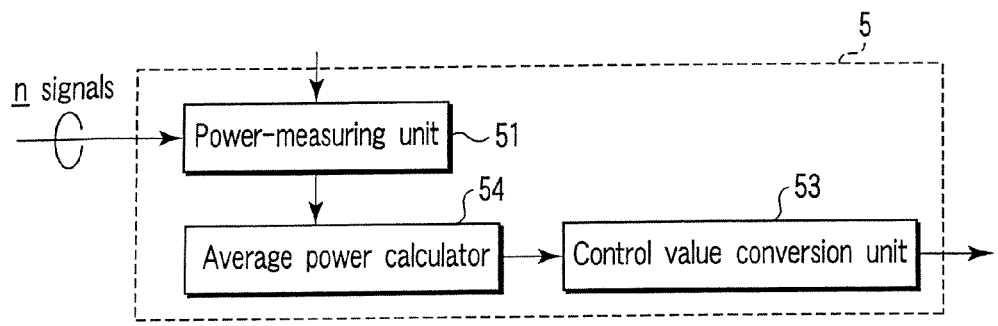
F I G. 12
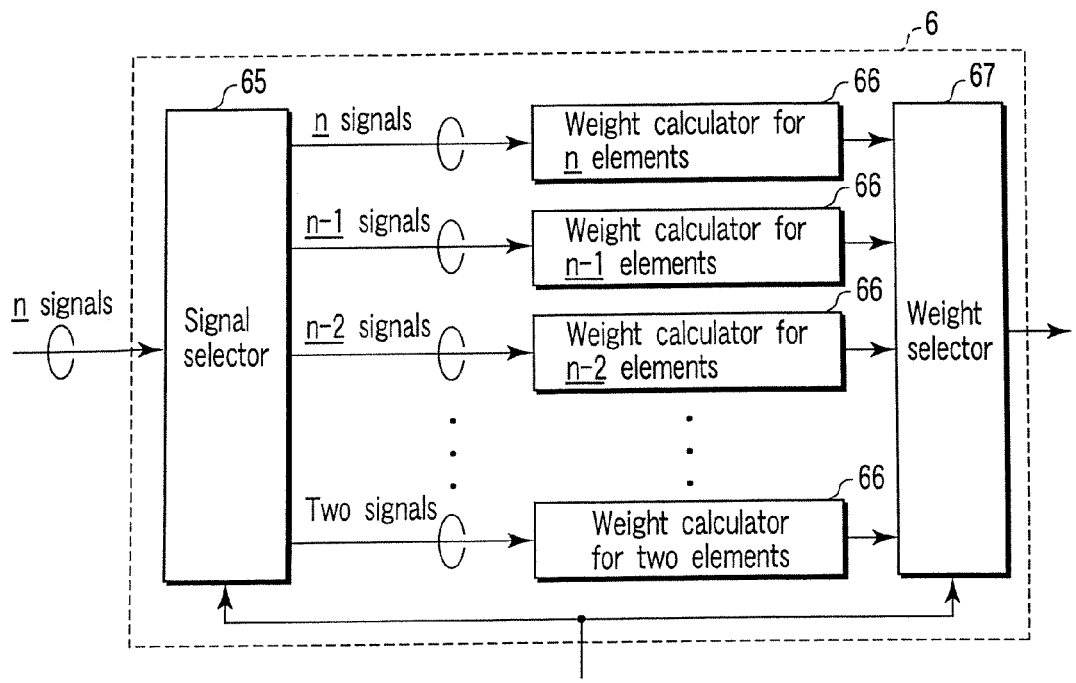
F I G. 13

RADIO RECEIVING APPARATUS AND METHOD

CROSS-REFERENCE TO RELATED APPLICATIONS

This application is a continuation of and claims the benefit of priority under 35 U.S.C. §120 from U.S. Ser. No. 10/950, 396, filed Sep. 28, 2004, and claims the benefit of priority under 35 U.S.C. §119 from the prior Japanese Patent Application No. 2004-017338, filed Jan. 26, 2004, the entire contents of which are incorporated herein by reference.

BACKGROUND OF THE INVENTION

1. Field of the Invention

The present invention relates to a radio receiving apparatus having a plurality of antenna elements, and a radio receiving method, and more particularly to a radio receiving apparatus in which a single control signal controls the gains of signals received by a plurality of antenna elements, and a radio receiving method employed in the apparatus.

2. Description of the Related Art

In general, receiving apparatuses for performing demodulation using digital signals must have an A/D converter. Most A/D converters convert, into digital signals, analog signals of only a certain power range. If an analog signal cannot appropriately be converted into a digital signal since its power exceeds the range, the resultant digital signal is distorted. It is well known that this distortion significantly degrades the receiving characteristic. To avoid distortion and maintain a good receiving characteristic, it is necessary to appropriately adjust the gain of an analog signal to be input to an A/D converter.

When there are a plurality of antenna elements, a plurality of gain adjusting devices are needed for adjusting the respective gains of signals received by the antenna elements. If the gain adjusting devices can be controlled individually, it is sufficient if each device adjusts the gain of a signal to be input to a corresponding A/D converter. However, if a plurality of gain adjusting devices must be controlled by a single control signal, it is difficult to appropriately control all input signals since the input signals may be adjusted using different gain-adjusting values.

As a technique for adjusting a plurality of gain adjusting devices using a single control signal, Jpn. Pat. Appln. KOKAI Publication No. 2003-152611, for example, has proposed a receiving apparatus in which a plurality of antenna elements and gain adjusting devices are employed, and all the gain adjusting devices are controlled by a single control signal.

However, if the amplitudes of analog signals received by the antenna elements are reduced, as in the publication, to values that enable the A/D converters to appropriately convert the analog signals into digital signals, the receiving characteristic of a synthetic signal obtained by synthesizing a plurality of digital signals corresponding to the analog signals may degrade.

An example case will be described. General radio sets have a noise floor that does not depend upon the reception power, therefore even if the reception power is increased to some extent, an increase in signal-to-noise ratio (SNR) is suppressed. Assume that one of the antenna elements receives a signal of a very high power, and the remaining antenna elements (two or more antenna elements) receive signals of power that falls within a range in which increases in SNR is suppressed. The receiving characteristic of the finally processed signal may be higher in the case where gain control is performed based on the antenna elements having substantially the same SNR as the maximum power antenna, and the signals received by these antenna elements are synthesized, than in the case where gain control is performed based on the maximum power antenna element, and therefore the remaining antenna elements cannot be used.

BRIEF SUMMARY OF THE INVENTION

The present invention has been developed in light of the above-described technique, and aims to provide a radio receiving apparatus that exhibits a high receiving characteristic when a single control signal is used to control signals received by a plurality of antennas, and a radio receiving method employed in the apparatus.

According to a first aspect of the invention, there is provided a radio receiving apparatus comprising: a plurality of antennas; a plurality of radio units adjusting gains of received signals output from the antennas, and outputting the adjusted received signals, respectively; a plurality of converters converting the adjusted received signals into a plurality of digital signals; a selector device which selects several of the digital signals, a combination of the selected digital signals exhibiting a good receiving characteristic; a controller which determines the gains and outputs a single control signal included in information of the determined gains to certain radio units, the certain radio units being included in the radio units and connected to certain converters of the converters which output digital signals included in the selected combination; a weight calculator which calculates a weight for each of the selected digital signals to enhance the receiving characteristic if the controller outputs the single control signal; a synthesizer which synthesizes, into a synthetic digital signal, a plurality of digital signals obtained by multiplying each of the selected digital signals by the weight; and a demodulator which demodulates the synthetic digital signal.

According to a second aspect of the invention, there is provided a radio receiving apparatus comprising: n (n: a natural number not less than 2) adjustment units configured to adjust each of gains of n signals received via n antennas, and output the received signals, respectively; n converters which convert the n received signals into n digital signals; a selector device which selects several of the n digital signals a combination of the selected digital signals exhibiting a good receiving characteristic; a controller which determines the gains and outputs a single control signal included in information of the determined gains to certain adjustment units, the certain adjustment units being included in the adjustment units and connected to certain converters of the converters which output digital signals included in the selected combination; a weight calculator which calculates a weight for each of the selected digital signals to enhance the receiving characteristic if the controller outputs the single control signal; a synthesizer which synthesizes, into a synthetic digital signal, a plurality of digital signals obtained by multiplying each of the digital signals by the weight; and a demodulator which demodulates the synthetic digital signal.

According to a third aspect of the invention, there is provided a radio receiving method comprising: adjusting each of gains of n (n: a natural number not less than 2) signals received via n antennas, and outputting the received signals, respectively; converting the n received signals into n digital signals; selecting several of the n digital signals a combination of the selected digital signals exhibiting a good receiving characteristic; determining the gains and outputting a single control signal included in information of the determined gains of the received signals which are converted into digital signals included in the selected combination; calculating a weight for each of the selected digital signals to enhance the receiving characteristic if the single control signal is output; synthesizing, into a synthetic digital signal, a plurality of digital signals obtained by multiplying each of the digital signals by the weight; and demodulating the synthetic digital signal.

BRIEF DESCRIPTION OF THE SEVERAL VIEWS OF THE DRAWING

FIG. 1 is a block diagram illustrating a radio receiving apparatus according to an embodiment of the invention;

FIG. 4 is a block diagram illustrating the element selector appearing in FIG. 1;

FIG. 5 is a block diagram illustrating the SNR-maximized element selector appearing in FIG. 4;

FIG. 6 is a block diagram illustrating the SNR estimation unit appearing in FIG. 5;

FIG. 7 is a block diagram illustrating the gain controller appearing in FIG. 1;

FIG. 11 is a block diagram illustrating a second modification of the SNR-maximized element selector appearing in FIG. 4;

FIG. 12 is a block diagram illustrating a modification of the gain controller appearing in FIG. 1; and FIG. 13 is a block diagram illustrating a modification of the weight calculator appearing in FIG. 1.

DETAILED DESCRIPTION OF THE INVENTION

Figure 2:
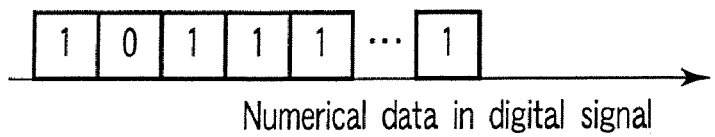
FIG. 2 is a view illustrating an element selection data example output from the element selector appearing in FIG. 1.

A radio receiving apparatus and method according to an embodiment of the invention will be described in detail with reference to the accompanying drawings.

Referring first to FIG. 1, a structure example of the radio receiving apparatus of the embodiment will be described. FIG. 1 is a block diagram illustrating the radio receiving apparatus of the embodiment.

In the radio receiving apparatus of the embodiment, the receiving characteristic of a to-be-demodulated signal is estimated, and a combination of received signals that enhances the receiving characteristic is selected. Further, the gain of each received signal is controlled, a weight to be imparted to each received signal after gain control is calculated, and a plurality of received signals are synthesized using the calculated weights. As shown in FIG. 1, the radio receiving apparatus comprises a plurality of antenna elements 1 (assume that the embodiment employs n (n is a natural number not less than 2) antenna elements 1, n radio units 2 and n analog-to-digital (A/D) converters 3. The radio receiving apparatus further comprises an element selector 4, gain controller 5, weight calculator 6, synthesizer 7 and demodulator 8.

Each antenna element 1 receives, for example, a signal transmitted from another radio communication device or base station, and transfers the received signal to the corresponding radio unit 2 (one radio unit 2 is assigned to each antenna element 1). The radio unit 2 adjusts the gain of the signal transferred from the corresponding antenna element 1, and converts it into a baseband signal. Further, the radio unit 2 removes an unnecessary signal component other than a desired channel signal. Each A/D converter 3 converts the baseband signal into a digital signal. Since one A/D converter 3 is assigned to each antenna element 1 and each radio unit 2, if the radio receiving apparatus incorporates n antenna elements 1, it also incorporates n radio units 2 and n A/D converters 3.

The element selector 4 receives digital signals output from the A/D converters 3, and estimates the receiving characteristic of a signal to be output from the synthesizer 7 and demodulated by the demodulator 8, using the received digital signals. After that, the element selector 4 selects some digital signals from the n digital signals output from the A/D converter 3, some digital signals being estimated to enhance the receiving characteristic. The element selector 4 will be described later in more detail with reference to FIGS. 4, 5 and 6. Further, a modification of the element selector 4 will be described referring to FIGS. 9, 10 and 11.

The element selector 4 generates a signal indicating element selection information that indicates which ones of the digital signals output from the n A/D converters 3 are selected. As shown in FIG. 2, the element selection information is formed of data items "0" and/or "1" arranged in a line corresponding to the A/D converters 3. "0" indicates that the corresponding digital signal is not selected, and "1" indicates that the corresponding digital signal is selected. Each data item "0" or "1" is contained in the above-mentioned signal corresponding to the A/D converters 3. For example, the first data item in the element selection information indicates whether the digital signal output from the first A/D converter 3 is selected, and the second data item indicates whether the digital signal output from the second A/D converter 3 is selected. The element selection information example of FIG. 2 indicates that the digital signals output from the first, third, fourth, fifth and the nth A/D converters 3 are selected, whereas the digital signal output from the second A/D converter 3 is not selected.

Based on the element selection information received from the element selector 4, the gain controller 5 controls the radio units 2 so that only the gains of the signals received by the radio units corresponding to the digital signals selected by the selector 4 will be adjusted. In other words, the gain controller 5 does not control the radio units 2 corresponding to the digital signals that were not selected by the element selector 4. The gain controller 5 will be described later in more detail with reference to FIG. 7. Further, a modification of the gain controller 5 will be described later with reference to FIG. 12.

Using the element selection information, the weight calculator 6 discriminates the digital signals selected by the element selector 4 from all the digital signals output from the n A/D converters 3 after the gain controller 5 controls the radio units 2 based on the element selection information. Subsequently, the weight calculator 6 acquires the discriminated digital signals, and calculates a weight for each of the selected digital signals, so that a signal obtained by synthesizing the selected digital signals exhibits a good receiving characteristic. For example, each weight is calculated to maximize the SNR of the synthetic signal. Alternatively, each weight may be calculated to minimize the level of an interference signal contained in the synthetic signal. In other words, each weight is calculated to maximize the signal-to-interference ratio (SIR). The weight calculator 6 will be described later in more detail with reference to FIG. 8. Further, a modification of the weight calculator 6 will be described later with reference to FIG. 13.

The synthesizer 7 uses the weights calculated by the weight calculator 6, to synthesize the digital signals output from the A/D converters 3 and selected by the element selector 4. In other words, each of the selected digital signals is multiplied by the corresponding one of the weights calculated in relation to the digital signals, and the multiplication results are synthesized by addition.

The demodulator 8 demodulates the digital signal synthesized by the synthesizer 7.

Figure 3:
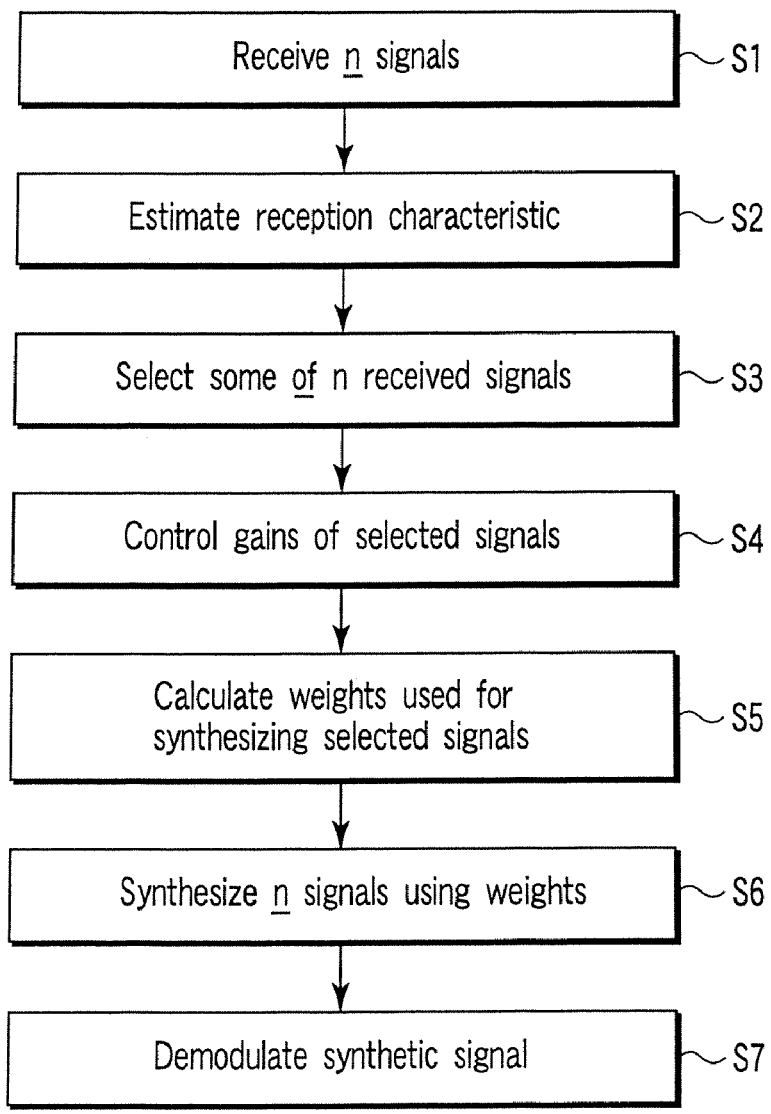
FIG. 3 is a flowchart illustrating an operation example of the radio receiving apparatus of the embodiment.

Referring to FIG. 3, a description will be given of an operation example of the radio receiving apparatus of the embodiment described with reference to FIG. 1.

Firstly, n (n is a natural number not less than 2) antenna elements 1 receive signals to n corresponding radio units 2. Each radio unit 2 adjusts the gain of the received signal to convert it into a baseband signal, and outputs the baseband signal to the corresponding to A/D converter 3. Each A/D converter 3 converts the baseband signal into a digital signal, and outputs the digital signal to the element selector 4, gain controller 5 and weight calculator 6 and synthesizer 7 (step S1).

Subsequently, the element selector 4 receives n digital signals from all the A/D converters 3, and estimates the receiving characteristic of each signal to be output from the synthesizer 7 and demodulated by the demodulator 8, based on the received digital signals (step S2). After that, the element selector 4 selects, from the n digital signals, the digital signals that are estimated to provide a good receiving characteristic (step S3).

The gain controller 5 outputs a control signal to the radio units 2 corresponding to the selected digital signals. Each radio unit 2 adjusts the gain of a signal transmitted from the antenna element 1 connected thereto (step S4). The weight calculator 6 calculates weights by which the digital signals corresponding to analog signals having their gains adjusted and output from the A/D converters 3 are multiplied during synthesizing the digital signals (step S5). More specifically, the weight calculator 6 calculates a weight for each of the selected digital signals so that the resultant synthetic signal will have a good receiving characteristic. For example, the weights are determined to maximize the SNR or SIR of the resultant synthetic signal.

The synthesizer 7 synthesizes the digital signals output from the A/D converters 3 and selected by the element selector 4, using the weights calculated at step S5 (step S6). The demodulator 8 demodulates the synthetic signal obtained at step S6 (step S7).

Referring to FIGS. 4, 5 and 6, the element selector 4 appearing in FIG. 1 will be described.

The element selector 4 comprises a power-measuring unit 41 and SNR-maximizing element selector 42. The power-measuring unit 41 receives n digital signals from the A/D converters 3, and measures the power of each digital signal. The SNR-maximizing element selector 42 creates a plurality of combinations of digital signals, based on the power of each digital signal measured by the power-measuring unit 41, and estimates the SNR of a synthetic signal resulting from each combination. Then, the SNR-maximizing element selector 42 selects a combination of digital signals that are synthesized into a synthetic signal of the maximum SNR, and outputs element selection information indicating the selected combination of digital signals.

In general radio sets including the radio receiving apparatus of the embodiment, the power and SNR of a signal output from each A/D converter 3 have a high correlation, therefore the SNR can be estimated from the power. Further, the SNR of a synthetic signal obtained by synthesizing the digital signals output from the n A/D converters 3 can also be estimated, from the fact that the noise components superposed on the digital signals have no correlation, and the pure signal components obtained by removing the noise components have a very high correlation. Since the SNR of a synthetic signal has a very high correlation with the receiving characteristic thereof, a synthetic signal of a higher receiving characteristic can be detected by comparing SNRs.

Referring now to FIG. 5, a description will be given of the SNR-maximizing element selector 42 shown in FIG. 4.

The SNR-maximizing element selector 42 comprises an SNR estimation unit 421, combination-creating unit 422, post-synthesis SNR estimation unit 423 and maximum combination selector 424. The SNR estimation unit 421 receives the power levels of the n digital signals measured by the power-measuring unit 41, thereby estimating the SNR of each digital signal and outputting the estimated SNR of each digital signal to the post-synthesis SNR estimation unit 423.

On the other hand, the combination-creating unit 422 creates a plurality of combinations of the n digital signals output from the n A/D converters 3, and supplies the combinations to the post-synthesis SNR estimation unit 423. The combination-creating unit 422 may output all combination of the n digital signals, i.e., 2n combinations. Alternatively, it may output only the combinations in which the number of digital signals selected therein is higher than a predetermined value. For example, when n=4, the number of all combinations is 16. In this case, if the combinations are limited to those in which the number of digital signals selected is not less than 3, the combination-creating unit 422 outputs only five combinations "0111", "1011", "1101", "1110" and "1111" (where "1" represents a selected digital signal, and "0" a non-selected digital signal). In general, the receiving characteristic of a synthetic signal often becomes better as the number of digital signals selected by the element selector 4 is increased. Therefore, even if the combination-creating unit 422 creates only combinations of a predetermined number or more of selected digital signals, the created combinations almost include the combination that provides the highest receiving characteristic. If the combination-creating unit 422 creates only such combinations, the amount of calculation by the combination-creating unit 422 can be reduced. As a result, the load of processing on the radio receiving apparatus of the embodiment can be reduced, which increases the processing rate of the apparatus.

The post-synthesis SNR estimation unit 423 receives the combinations created by the combination-creating unit 422, and the SNRs of the n digital signals estimated by the SNR estimation unit 421, thereby estimating the SNR of a synthetic signal obtained by synthesizing the digital signals included in each combination. The unit 423 outputs the combinations and the SNRs related thereto. The maximum combination selector 424 selects the combination with the maximum SNR from the combinations with their respective SNRs transmitted from the post-synthesis SNR estimation unit 423. The maximum combination selector 424 outputs the combination with the maximum SNR as element selection information.

Referring to FIG. 6, the SNR estimation unit 421 appearing in FIG. 5 will be described.

The SNR estimation unit 421 includes a table 4211 and interpolation unit 4212. In general, radio sets, since the power and SNR of a signal have a high correlation, the SNR can be estimated from the power. Therefore, the table 4211 stores a plurality of SNRs corresponding to a plurality of power levels. It is desirable that the power levels stored in the table 4211 are included in a range close to the power levels expected to be output from the power-measuring unit 41. For example, if the table 4211 stores a power level identical to that output from the power-measuring unit 41, an SNR corresponding to this power level is output, whereas if the table 4211 does not store such a power level, data stored in the table 4211 is supplied to the interpolation unit 4212. The interpolation unit 4212 calculates an SNR corresponding to the input power level by performing interpolation on discrete power levels stored in the table 4211.

The interpolation unit 4212 receives n power levels from the power-measuring unit 41, and calculates SNRs corresponding to the respective input power levels, referring to the table 4211. If the power levels transmitted from the power-measuring unit 41 are substantially the same as those stored in the table 4211, the corresponding SNRs stored in the table 4211 are determined as the SNRs of the input power levels. However, the power level transmitted from the power-measuring unit 41 is not always included in the power levels stored in the table 4211. If the table 4211 does not store a corresponding power level, the interpolation unit 4212 performs interpolation on a plurality of power levels stored in the table 4211, using a plurality of corresponding SNRs, thereby acquiring an SNR corresponding to the power level transmitted from the power-measuring unit 41. More specifically, if the input power level falls within the power level range in the table 4211, the SNR corresponding to the input power level is acquired by interpolation. On the other hand, if the input power level falls outside the power level range in the table 4211, the SNR corresponding to the input power level is acquired by extrapolation. Alternatively, the interpolation unit 4212 may interpolate the power levels and corresponding SNRs stored in the table 4211, thereby acquiring continuous functions indicating the relationship between the power levels and SNRs, and acquiring, from the functions, the SNR corresponding to the power level transmitted from the power-measuring unit 41.

The above-mentioned element selection information indicating the digital signals selected by the element selector 4 is input to the gain controller 5. The gain controller 5 will be described with reference to FIG. 7.

The gain controller 5 comprises a power-measuring unit 51, maximum power determination unit 52 and control value conversion unit 53. The power-measuring unit 51 is substantially the same as the power-measuring unit 41 incorporated in the element selector 4 that has been described with reference to FIG. 4. However, the former differs from the latter in that in the former, the power levels of only digital signals included in the element selection information transmitted from the element selector 4 are measured. Alternatively, power levels measured by the power-measuring unit 41 may be stored in a memory (not shown), and the power-measuring unit 51 may read, from the memory, a power level corresponding to each digital signal included in the element selection information.

The maximum power determination unit 52 acquires the maximum power level from the power levels measured by the power-measuring unit 51, and outputs it. The control value conversion unit 53 supplies a gain control signal to all radio units 2 so that an analog signal even from the radio unit 2 corresponding to the digital signal of the maximum power level determined by the maximum power determination unit 52 will have an amplitude level that enables the corresponding A/D converter 3 to appropriately perform A/D conversion of the analog signal. As shown in FIG. 1, the gain control signal is substantially simultaneously supplied to all the radio units 2. Since the analog signal corresponding to the digital signal having the maximum power level is adjusted to an appropriate amplitude, all signals output from the radio units 2 and selected by the element selector 4 are adjusted to appropriate levels for the A/D converters 3. In other words, all selected signals can be made to fall within the dynamic range of the A/D converters 3. Accordingly, the digital signals output from the A/D converters 3 can be controlled to appropriate power levels.

Figure 8:
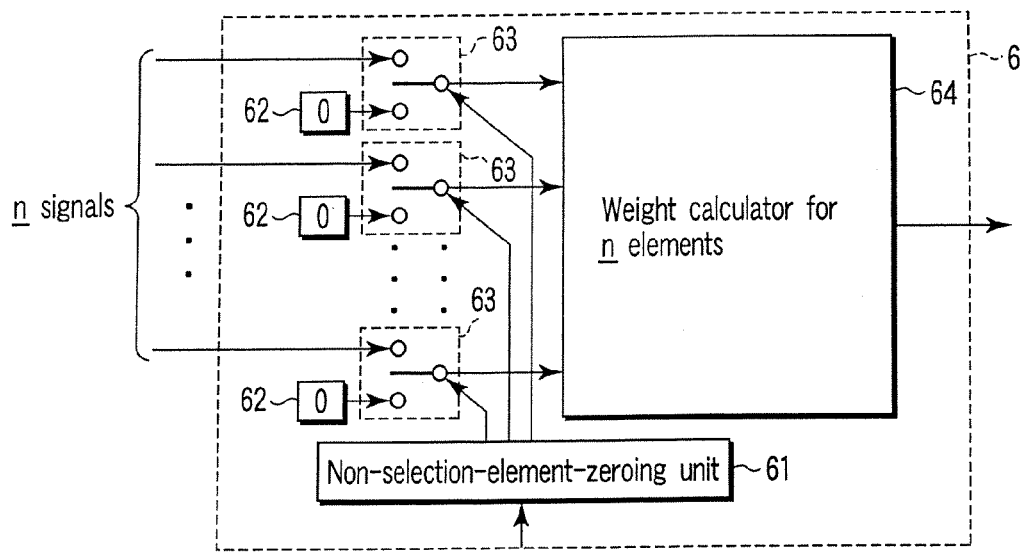
FIG. 8 is a block diagram illustrating the weight calculator appearing in FIG. 1.

The digital signals output from the A/D converters 3 after gain control are input to the weight calculator 6 shown in FIG. 1. The weight calculator 6 calculates a weight for each selected digital signal. Referring to FIG. 8, the weight calculator 6 will be described in detail.

The weight calculator 6 comprises a non-selection-element-zeroing unit 61, zero-signal output units 62, switches 63 and a weight calculator 64 for n of elements. The non-selection-element-zeroing unit 61 receives element selection information from the element selector 4, and determines whether each of n digital signals should be input. The determination result corresponding to each digital signal is output. Each zero-signal output unit 62 outputs a "0" signal.

Based on the determination result of the non-selection-element-zeroing unit 61, each switch 63 performs switching as to whether the corresponding digital signal output from the corresponding A/D converter 3 after gain control should be transferred to the weight calculator 64. Specifically, if the determination result of the non-selection-element-zeroing unit 61 indicates that the digital signal should be transferred (if the signal is selected), the signal is output to the weight calculator 64. On the other hand, if the determination result of the non-selection-element-zeroing unit 61 indicates that the digital signal should not be transferred (if the signal is not selected), a zero signal is output from the corresponding zero-signal output unit 62 to the weight calculator 64.

The weight calculator 64 calculates the weight of the nth element. As stated above, the weight calculator 64 calculates a weight for each selected digital signal so that the weight will enhance the receiving characteristic of each selected digital signal and hence a synthetic signal obtained by synthesizing the selected digital signals will have a good receiving characteristic. The weight calculator 64 always performs this process without using election element information. In the weight calculator 6 shown in FIG. 8, a zero signal is input for a non-selected digital signal to the weight calculator 64, which does not require weight calculation using element selection information. Another example of the weight calculator 6 will be described later with reference to FIG. 13.

After that, the synthesizer 7 multiplies each selected digital signal by the corresponding weight calculated by the weight calculator 6, and synthesizes the resultant digital signals into a synthetic signal. The demodulator 8 demodulates the synthetic signal.

As described above, in the radio receiving apparatus of the embodiment, the receiving characteristic of a signal to be demodulated is estimated, and digital signals that enhance the reception signal are selected to adjust the gain of a reception signal output from each radio unit. As a result, a signal of a good receiving characteristic can be demodulated.

Referring now to FIGS. 9 to 13, modifications of the element selector 4 of FIG. 4, the SNR-maximizing element selector 42 of FIG. 5, the gain controller 5 of FIG. 7 and the weight calculator 6 of FIG. 8 will be described.

(Modification of Element Selector 4)

Figure 9:
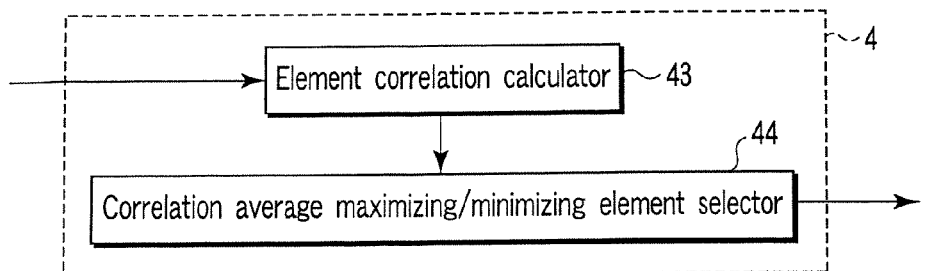
FIG. 9 is a block diagram illustrating a modification of the element selector appearing in FIG. 1.

The modification of the element selector 4 shown in FIG. 9 comprises an element correlation calculator 43 and correlation average maximizing/minimizing element selector 44. The element correlation calculator 43 calculates correlation values between n digital signals output from n A/D converters 3. Specifically, all combinations, each of which is formed of two digital signals are selected from the n digital signals, and a correlation value between the digital signals of each combination is calculated. For example, if n=3, there exist three combinations, i.e., the combination of the first and second digital signals, the combination of the first and third digital signals, and the combination of the second and third digital signals. A correlation value between the two digital signals of each of the three combinations is calculated.

The correlation average maximizing/minimizing element selector 44 calculates the average of the correlation values calculated by the element correlation calculator 43, and selects digital signals that make the average maximum or minimum. It may be assumed that the minimum number of selected digital signals is two or more. It depends upon a desired receiving characteristic whether to select digital signals that make the average of the correlation values maximum, or to select digital signals that make the average minimum. If the weight calculator 6 calculates a weight for each digital signal using maximum-ratio synthesis, the correlation average maximizing/minimizing element selector 44 selects digital signals that make the average maximum. On the other hand, if the radio receiving apparatus is of a multi-input multi-output (MIMO) system, the correlation average maximizing/minimizing element selector 44 selects digital signals that make the average minimum. The maximum-ratio synthesis means calculation of a weight for each digital signal by the weight calculator 6 to maximize the SNR of the synthetic signal of the digital signals obtained by the synthesizer 7. Further, the MIMO system is for remarkably increasing the communication capacity (bps/Hz), by transmitting different data strings with a single frequency in a parallel manner using a plurality of antennas. In the MIMO system, the weight calculator 6 calculates a weight for each digital signal to maximize the SNR of a synthetic signal output from the synthesizer 7. Furthermore, in the MIMO system, it is preferable that the correlation values between digital signals corresponding to the antenna elements 1 be low, since this means that the digital signals indicate different data items.

(Modification of SNR-Maximizing Element Selector 42)

Figure 10:
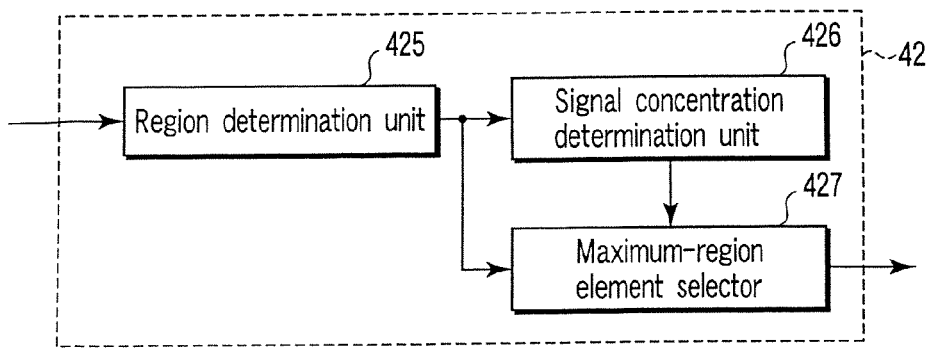
FIG. 10 is a block diagram illustrating a first modification of the SNR-maximized element selector appearing in FIG. 4.

The modification of the SNR-maximizing element selector 42 shown in FIG. 10 comprises a region determination unit 425, signal concentration determination unit 426 and maximum-region element selector 427. The region determination unit 425 beforehand divides, into a plurality of regions, the power range expected to be obtained when the power-measuring unit 41 performs measurement, and determines to which region the power of each digital signal output from the power measuring unit 41 belongs.

The signal concentration determination unit 426 counts the number of digital signals belonging to each region, and outputs a signal concentration obtained by multiplying the number by a weight. For example, weights 0.5, 0.8 and 1.0 are imparted to the respective three regions of the power range. If one, two and three digital signals belong to the respective three regions, their respective signal concentrations are 0.5 (=0.5×1), 1.6 (=0.8×2) and 3.0 (=1.0×3). By setting, as the signal concentration, the value obtained by multiplying, by a weight, the number of digital signals belonging to each region, the region that is narrow or has a high power value can be weighted.

The maximum-region element selector 427 determines a region having a highest signal concentration, based on the data output from the signal concentration determination unit 426, selects the digital signals belonging to the determined region, and outputs element selection information indicating the selected digital signals. Alternatively, the maximum-region element selector 427 may select digital signals that belong to, for example, the regions having the maximum signal concentration and the second maximum signal concentration. Yet alternatively, digital signals may be selected, which belong to a region of a power value lower than that of the region in which the signal concentration is maximum.

When a plurality of signals are controlled using a single control signal, it is difficult to adjust the gains of signals having large power differences to an appropriate gain for a plurality of A/D converters 3. However, if a region in which digital signals of similar power values exist is detected and these digital signals are selected, as stated above, the SNR of a synthetic signal output from the synthesizer 7 may well be enhanced.

Referring to FIG. 11, another modification of the modification of the SNR-maximizing element selector 42 will be described. The SNR-maximizing element selector 42 shown in FIG. 11 comprises a power difference determination unit 428 and peripheral region element selector 429. The power difference determination unit 428 extracts all combinations of two power values from the power values of the n digital signals generated by the power-measuring unit 41, and calculates the power difference between each combination. The peripheral region element selector 429 receives the power differences of all combinations from the power difference determination unit 428, selects a pair of digital signals that has a smallest power difference, and also selects digital signals having power values that fall within a certain power range including the power values of the pair of digital signals. After that, the peripheral region element selector 429 outputs element selection information indicating that the pair of digital signals having the smallest power difference, and the digital signals having power values falling within the range are selected digital signals.

Where digital signals of similar power values exist, they are considered to have small power differences. Accordingly, if digital signals having power values close to the power values of two digital signals of a small power difference are selected, it is expected that the SNR of a synthetic signal can be enhanced.

(Modification of Gain Controller 5)

The modification of the gain controller 5 shown in FIG. 12 comprises a power-measuring unit 51, average power calculator 54 and control value conversion unit 55. The power-measuring unit 51 is similar to the power-measuring unit 51 of the gain controller 5 shown in FIG. 7, therefore is not described in detail. The average power calculator 54 calculates the average of power values measured by the power-measuring unit 51, and outputs it to the control value conversion unit 55. The control value conversion unit 55 supplies a gain control signal to the radio unit 2 that corresponds to the digital signal of the average power value calculated by the average power calculator 54. This gain control signal is used for adjusting the amplitude of a signal, output from that radio unit 2 to the corresponding A/D converter 3, to a level that enables the converter to appropriately A/D convert the signal. As shown in FIG. 1, this gain control signal is simultaneously supplied to all radio units 2. By controlling the amplitude of a signal corresponding to the signal having the average power value, the digital signals output from the radio units 2 and selected by the element selector 4 can have a relatively satisfactory receiving characteristic even if they are not so appropriate.

When the gain controller 5 measures the power of each digital signal as shown in FIG. 7 or 12, and calculates a control signal using the measured power value, power measurement can be performed more accurately by beforehand reducing the gain control signal to an appropriate value.

(Modification of Weight Calculator 6)

The modification of the weight calculator 6 shown in FIG. 13 comprises a signal selector 65, weight calculators 66 for k elements (k=2, 3, . . . , n−1, n), and weight selector 67. The signal selector 65 receives element selection information, and supplies digital signals selected by the element selector 4 to the weight calculator 66 that corresponds to the number of selected digital signals. If there is no weight calculator 66 that corresponds to the number of selected digital signals, all selected digital signal are output to the weight calculator 66 for minimum elements, which is included in the weight calculators 66 for respective numbers of elements, the respective numbers being greater than the number of the digital signals. At this time, if the number of digital signals is smaller than the number of selected weight calculators 66, a zero signal is output to each of the extra ones of the selected weight calculators. Further, the signal selector 65 outputs no signal to the other non-selected weight calculators 66.

The weight calculators 66 for k elements calculate weights for k elements. As described above, the weight calculators 66 for the k elements calculate weights that enable each selected digital signal to have a good receiving characteristic so as to enhance the receiving characteristic of a synthetic signal obtained by synthesizing the selected digital signals.

The weight selector 67 selects, from the weights generated by all the weight calculators 6, a weight output from the weight calculator 66 corresponding to the number of digital signals selected based on the element selection information, and outputs the weight. If there is no weight calculator 66 that corresponds to the number of selected digital signals, the weight selector 67 selects a weight output from the weight calculator 66 for minimum elements, which is included in the weight calculators 66 for respective numbers of elements, the respective numbers being greater than the number of the digital signals. Then, the weight selector 67 outputs the selected weight. Although this modification is more complex than that shown in FIG. 8, it can provide a more accurate weight since an appropriate number of weight calculators 66 for the number of selected digital signals calculate respective weights, using dedicated algorithms corresponding to the number of selected digital signals.

The "power" used in the embodiment can be also interpreted as an average amplitude or the number of clippings. The average amplitude is proportional to the square root of power, therefore can be treated equally with power. The number of clippings indicates the number of samples in which the A/D converter assumes the minimum or maximum value. In general, the higher the power, the larger the number of clippings. This being so, the number of clippings can be treated equally with power.

In the embodiment, a digital signal input to a power-measuring unit (e.g., the power-measuring unit 41 or 51) can be replaced with a signal obtained immediately before the digital signal is subjected to A/D conversion. In this case, the power-measuring unit is replaced with a unit for receiving an analog signal and outputting a digital signal that indicates the power of the analog signal.

Additional advantages and modifications will readily occur to those skilled in the art. Therefore, the invention in its broader aspects is not limited to the specific details and representative embodiment shown and described herein. Accordingly, various modifications may be made without departing from the spirit or scope of the general inventive concept as defined by the appended claims and their equivalents.

What is claimed is:

1. A radio receiving method comprising:
preparing a plurality of antennas;
preparing a plurality of radio units adjusting gains of received signals output from the antennas, and outputting the adjusted received signals, respectively;
preparing a plurality of converters converting the adjusted received signals into a plurality of digital signals;
selecting several of the digital signals, a combination of the selected digital signals exhibiting a good receiving characteristic;
determining the gains and outputting a single control signal included in information of the determined gains to certain radio units, the certain radio units being included in the radio units and connected to certain converters of the converters which output digital signals included in the selected combination;
calculating a weight for each of the selected digital signals to enhance the receiving characteristic if the single control signal is output;
synthesizing, into a synthetic digital signal, a plurality of digital signals obtained by multiplying each of the selected digital signals by the weight; and
demodulating the synthetic digital signal.

2. The method according to claim 1, wherein selecting several of the digital signals includes:
measuring a power value of each of the digital signals;
selecting, based on the power value, several of the digital signals, to form the combination;
estimating a signal-to-noise ratio of a synthetic signal obtained by synthesizing the digital signals; and
selecting the combination which exhibits a maximum signal-to-noise ratio.

3. The method according to claim 2, wherein selecting several of the digital signals includes:
estimating signal-to-noise ratios of the digital signals, based on the power value;
forming the combination;
estimating the signal-to-noise ratio, based on the estimated signal-to-noise ratios; and
selecting the combination which includes a plurality of digital signals for exhibiting a maximum signal-to-noise ratio.

4. The method according to claim 3, wherein forming the combination forms the combination including number of the digital signals with values other than 0.

5. The method according to claim 3, wherein estimating signal-to-noise ratios of the digital signals based on the power value includes:
storing in a storage unit a plurality of signal-to-noise ratios corresponding to a plurality of power values which the digital signals have;
acquiring a power value of each of the digital signals;
acquiring, from the storage, a signal-to-noise ratio corresponding to the power value if the storage stores a value corresponding to the power value; and acquiring the signal-to-noise ratio corresponding to the power value by interpolation if the storage fails to store the value corresponding to the power value.

6. The method according to claim 2, wherein selecting several of the digital signals includes:
determining a power region to which the power value of each of the digital signals belongs, the power region being included in a plurality of power regions of a power range;
counting a plurality of digital signals belonging to each of the power regions to obtain a number of the digital signals, and assigning weights to each of the power regions;
multiplying the number of the digital signals by a corresponding weight to provide the multiplication result as a signal concentration for each of the power regions; and
selecting the combination of the digital signals which includes a digital signal belonging to a region which has a maximum one of signal concentrations provided for the power regions.

7. The method according to claim 2, wherein selecting several of the digital signals includes:
extracting all combinations of two digital signals from the digital signals to calculate a power difference of the two digital signals included in each of the combinations;
extracting, from all the combinations, a combination of two digital signals having a smallest power difference; and
selecting the extracted combination and at least one of digital signals having power values falling within a power range which includes power values of the two digital signals included in the extracted combination.

8. The method according to claim 1, wherein selecting several of the digital signals includes:
extracting all combinations of two digital signals from the digital signals to calculate a correlation value of the two digital signals included in each of the combinations;
calculating an average of correlation values calculated between all the combinations;
selecting, based on the average, several of the digital signals;
forming a plurality of combinations of the selected digital signals; and
selecting one of the formed combinations.

9. The method according to claim 8, wherein calculating the average selects a combination of digital signals which make the average maximum, if calculating the weight calculates the weight for each of the selected digital signals, the synthetic digital signal of the selected digital signals having a maximum signal-to-noise ratio.

10. The method according to claim 8, wherein calculating the average selects combinations of digital signals which make the average minimum, if calculating the weight calculates the weight for each of the selected digital signals, the synthetic digital signal of the selected digital signals having a maximum signal-to-interference ratio.

11. The method according to claim 1, wherein determining the gains and outputting the single control signal includes:
measuring a plurality of power values of the digital signals included in the selected combination;
determining a maximum power value included in the measured power values and a digital signal which has the maximum power value;
generating the single control signal for adjusting a plurality of amplitudes of received signals output from several of the radio units, the received signal corresponding to the maximum power value being converted into a digital signal by a corresponding one of the converters; and
outputting the single control signal to the radio units.

12. The method according to claim 1, wherein determining the gains and outputting the single control signal includes:
measuring a plurality of power values of the digital signals included in the selected combination;
calculating an average of the measured power values;
generating the single control signal included in information of a plurality of amplitudes of received signals output from several of the radio units, a magnitude of the amplitude corresponding to a magnitude of the average, the received signals being converted into a plurality of digital signals by corresponding converters; and
outputting the single control signal to the radio units.

13. The method according to claim 1, wherein calculating the weight includes:
acquiring the digital signals;
outputting zero signals corresponding to several of the acquired digital signals which fail to be included in the selected combination;
outputting the digital signals which are included in the selected combination;
acquiring the zero signals and the digital signals which are included in the selected combination; and
calculating a weight for each of the digital signals included in the selected combination.

14. The method according to claim 1, wherein calculating the weight includes:
preparing a plurality of calculators which differ in number of digital signals for which weights are calculated;
acquiring the selected combination;
detecting a number of the digital signals included in the selected combination;
selecting one of the calculators which corresponds to the detected number;
outputting the selected combination to the selected calculator;
outputting a plurality of weights for the digital signals included in the selected combination.

* * * * *